DELEAVER FOR CONTINUOUS FORM STATIONERY

Filed June 19, 1961 6 Sheets-Sheet 1

Inventors:
Leonard M. Narel
Robert M. Pine
By: Hofgren, Brady, Wegner, Allen & Stellman
Attorneys

DELEAVER FOR CONTINUOUS FORM STATIONERY

Filed June 19, 1961

Feb. 26, 1963 R. M. PINE ETAL 3,079,142

DELEAVER FOR CONTINUOUS FORM STATIONERY

Filed June 19, 1961 6 Sheets-Sheet 5

3,079,142

DELEAVER FOR CONTINUOUS FORM STATIONERY

Robert M. Pine and Leonard M. Narel, Chicago, Ill., assignors to Uarco, Inc., a corporation of Illinois
Filed June 19, 1961, Ser. No. 118,164
11 Claims. (Cl. 270—52.5)

This invention relates to deleaving mechanisms and more particularly, to a mechanism for deleaving continuous form stationery comprising a plurality of record sheets with carbon sheets interleaved therebetween.

In recent years the use of continuous form stationery for data recording has increased immensely. Commensurate with the increased use of this stationery has been the requirement for speedier processing of data transferred to this stationery. Generally this stationery consists of multiple plies of record sheets with carbon sheets interleaved. Most recently, multiple ply continuous form stationery has been developed which transforms data received on the top record sheet to the other record sheets in the ply and without the use of carbon sheets. This is accomplished by means of specially treating the back of the record sheets themselves. Prior to analyzing data recorded on such stationery, the multiple record sheets must be separated and in stationery including carbon sheets the carbon sheets must be removed.

Deleavers currently in use often create certain problems, such as a tendency to cause misalignment between the several plies of the stationery and a resulting interruption of the operation of the mechanism, requiring attention of an attendant and impeding the flow of processing. Also, current deleaver mechanisms are not capable of deleaving continuous form stationery which does not include interleaved carbon sheets.

It is therefore an object of this invention to provide a mechanism for deleaving continuous form stationery which is free from the objections mentioned above.

It is another object of this invention to provide such a mechanism which is adapted to maintain alignment of the several plies of the stationery.

It is yet another object of this invention to provide such a mechanism which is adapted to deleave varying widths and varying plies of continuous form stationery.

It is still another object of this invention to provide such a mechanism which is adapted to deleave continuous form stationery which does not contain carbon sheets interleaved between the record sheets.

It is still a further object of this invention to provide a mechanism for deleaving stationery which is adapted to neatly stack the individual deleaved record sheets.

It is yet another object of this invention to provide a mechanism for deleaving stationery which has a stacking shelf for receiving a stack of continuous form stationery, a tensioning means and drag means for facilitating alignment of the stationery, means for driving said stationery, spindles for receiving carbon sheets and receiving shelves to receive the individual deleaved record sheets of the stationery.

Other objects and advantages of this invention will become apparent from the following description taken in conjunction with the accompanying drawings.

Figure 1:
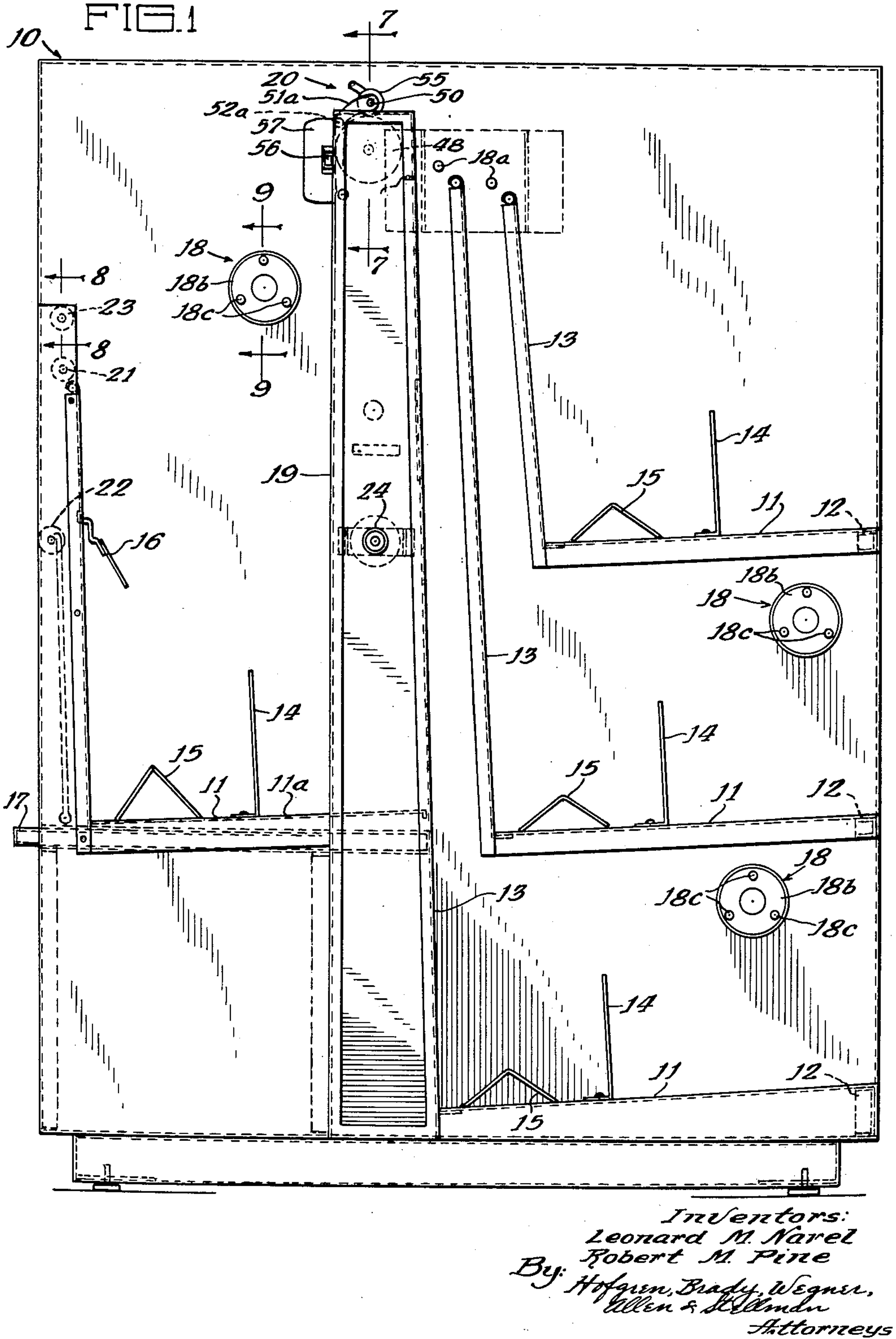
FIGURE 1 is a front elevation view of a device embodying the invention.
Figure 2:
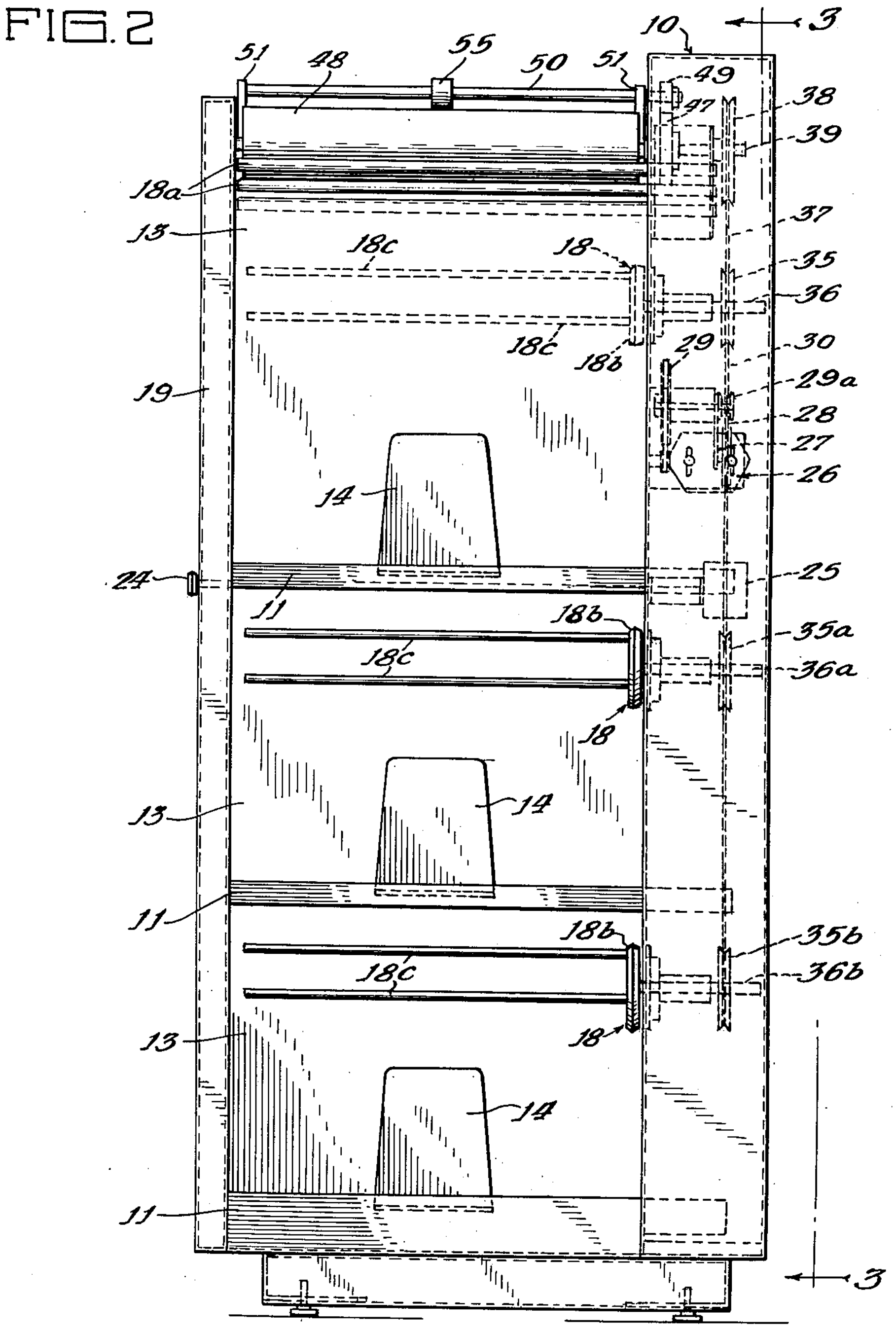
FIGURE 2 is an end elevational view of the device shown in FIGURE 1.

Referring now to the drawing, in FIGURE 1 is shown a deleaver mechanism 10. The deleaver includes a number of stacking shelves 11 which are quite similar in construction so that only one will be described and similar numbers will be shown on corresponding shelves. The stacking shelves 11 are secured to the mechanism by means of brackets 12 and vertical back plates 13. Slidably mounted in the receiving shelves 11 are adjustable form guides 14. The guides are movable in conventional manner to accommodate various record sheet sizes. Mounted between the vertical backs 13 and adjustable form guides 14 are triangular pile level plates 15 adapted to prevent end pile up of the record sheets. The first vertical back 13*a* is additionally provided with an adjustable refold kick plate 16 which is adapted to urge the refold of undeleaved sheets as will be described later.

Slidably located within the receiving shelf 11*a* is a supply tray 17. This tray is designed to be pulled out to support a stationary pack to be separated.

A weighted roller 22, or tensioning means, is vertically slidably mounted in the mechanism. The roller 22 and adjustable drag roller or drag means 23 cooperate with the drive roller 21 and drive roller assembly 20 to maintain alignment of the stationary. This cooperation and these devices will be described later in detail. Carbon rewind units 18 for receiving interleaved carbon sheets are provided and will be explained later. A vertical support bracket 19 contains a power control knob 24. The knob 24 is a calibrated push-pull type of switch and is connected to a power source to be explained later and controls variation of the speed of the drive system. Knob 24 is calibrated in plies of stationary and can be pre-set so that the speed of the mechanism can be correlated with regard to the number of plies of stationary. Therefore, the mechanism will commence running at approximately the correct speed to maintain neat deleaving.

Figures 4, 5:
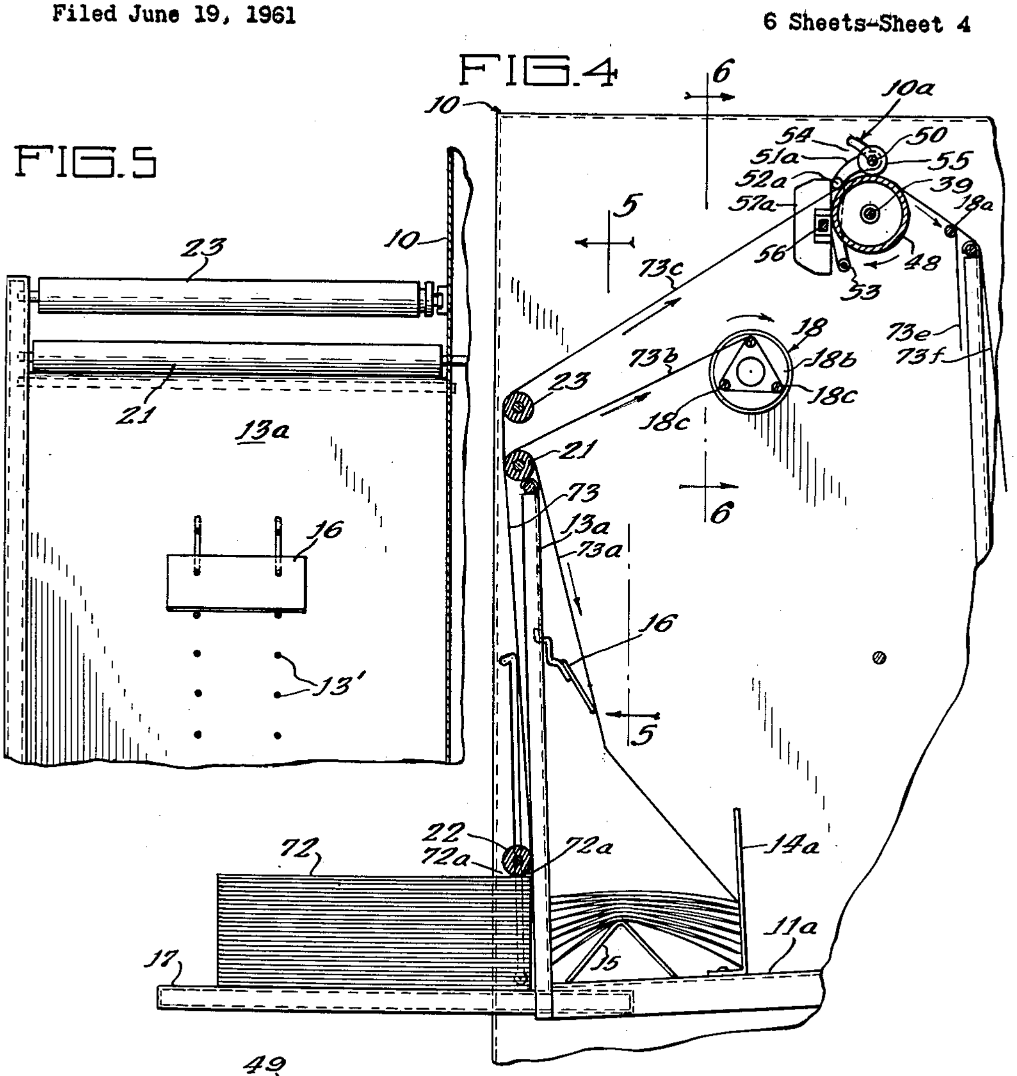
FIGURE 4 is a fragmentary front elevation view similar to FIGURE 1 showing the method of feeding the machine.
FIGURE 5 is a fragmentary view taken along the line 5—5 of FIGURE 4.

The refold kick plate 16 is shown in greater detail in FIGURE 5. The wall 13*a* is provided with holes (13′) by means of which the vertical position of the insertionally mounted plate 16 may be varied. This plate urges the refold of undeleaved sheets when more than 4 ply stationary is fed into the mechanism. The plate 16 is mounted on the wall 13*a* at a height wherein the distance from the plate 16 to the shelf 11 at the foot of guide 14 equals approximately one fold length of the stationary. By striking this plate when it is positioned as described, multiple plies of undeleaved stationary are urged to deflect at the fold lines and therefore assume a neat stack on shelf 11.

Figures 8, 9, 10:
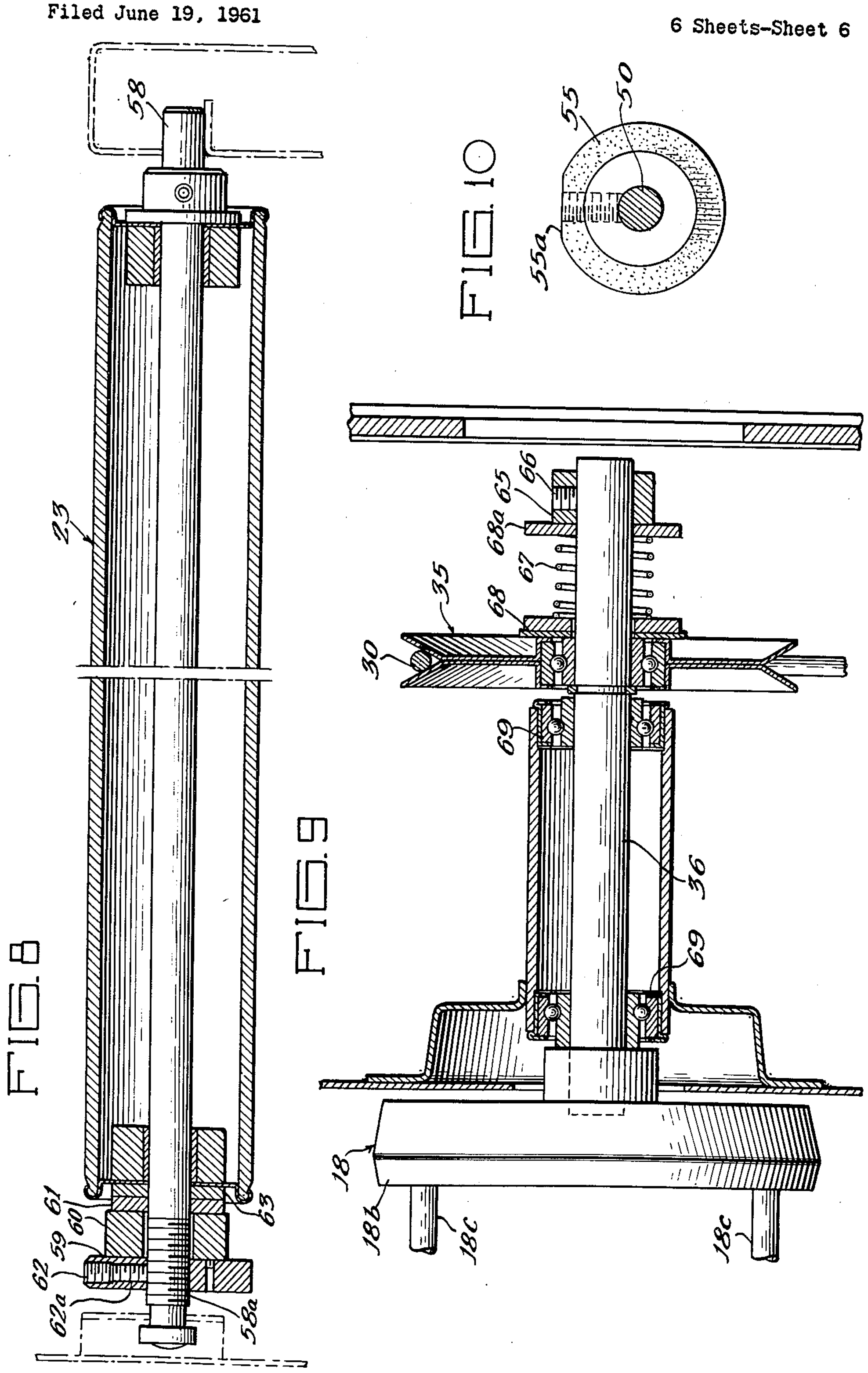
FIGURE 8 is an enlarged partial sectional view taken along the line 8—8 of FIGURE 1.
FIGURE 9 is an enlarged sectional view taken along the line 9—9 of FIGURE 1.
FIGURE 10 is an enlarged sectional view taken along the line 10—10 of FIGURE 7.

In FIGURE 8 there is shown an enlarged section view of drag roller 23. Drag roller 23 is rotatably mounted on drag roller shaft 58, which has a threaded end 58*a*. A friction adjusting wheel 59, resilient pressure disc 60 and fibrous pressure washer 61 are located at the threaded end. By adjusting the location of wheel 59 which is threadedly held on the shaft 58 by means of set screw 62, the braking force or drag of roller 23 may be varied.

Referring now to FIGURE 9, there is shown a section view of a carbon rewind unit. Mounted on carbon rewind shaft 36 are a collar 65, fibrous washers 68 and 68*a*, a tensioning spring 67, and carbon rewind pulley 35. Bearings 69 are provided to facilitate rotation. Carbon rewind spindles **18*c* are permanently secured in carbon reel 18*b*. Because pulley 35 is being driven by the same belt as the driving roller, the friction applied to pulley 35 is adjustable through collar 65, washer 68 and spring 67 so that reel 18*b*** only takes up the carbon offered by the driving roller and does not tend to drive the stationery.

Figure 6:
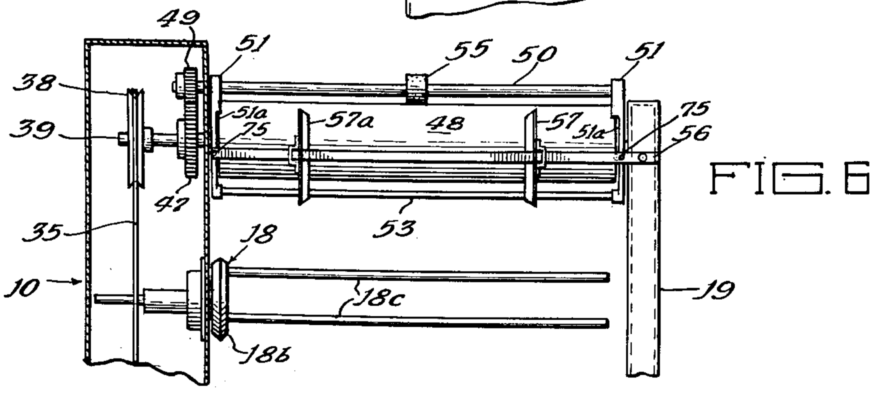
FIGURE 6 is a fragmentary view taken along the line 6—6 of FIGURE 4.
Figure 7:
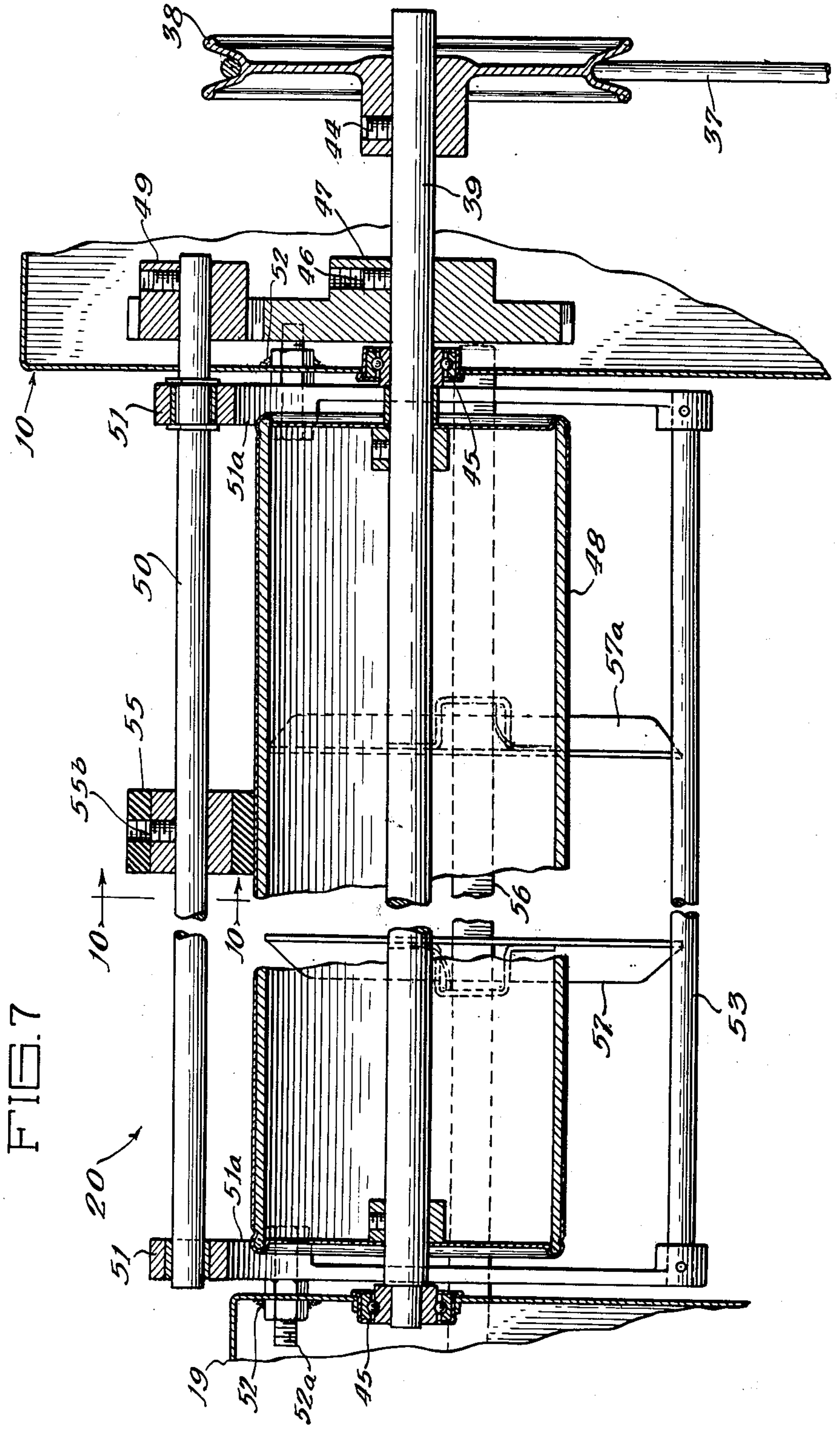
FIGURE 7 is an enlarged partial sectional view taken along the line 7—7 of FIGURE 1.

The feed roller unit 20 is shown in greater detail in FIGURE 6 and, a portion of it in section, in FIGURE 7. In FIGURE 7, the unit 20 is seen to include a pulley 38 attached to feed roller shaft 39. Shaft 39 is journaled in bearings 45 and has mounted upon it feed roller gear 47 and feed roller 48. Meshing with gear 47 is pressure roller gear 49, mounted on pressure roller arms 51. Pressure roller 55 is movably secured to shaft 50 by the set screw **55*b*. This allows adjustment of the roller to accommodate varying paper sizes. Pressure roller arms 51 are pivotally mounted to the mechanism at 52 and are maintained in fixed spaced relation by tie rod 53. As shown in FIGURE 4, shaft 50 passes through the wall of the mechanism 10 through an arcuate slot 10*a*. The purpose of this structure will be explained later. Also included in unit 20 is the paper guide support 56 having slidably mounting thereon paper guides 57 which can be adjusted to varying widths to correspond to the stationery being fed in the mechanism. As seen in FIGURE 6, set screws 75 are located near the end of each guide bar. These screws cooperate with arms 51 and shaft 50 to adjust the surface contact of rollers 48 and 55**.

FIGURE 10 shows a section view of pressure roller 55. This view indicates that a portion **55*a* of the periphery of the roller 55** is provided with a flat surface. The purpose of this flat surface will be explained later in detail.

Figure 3:
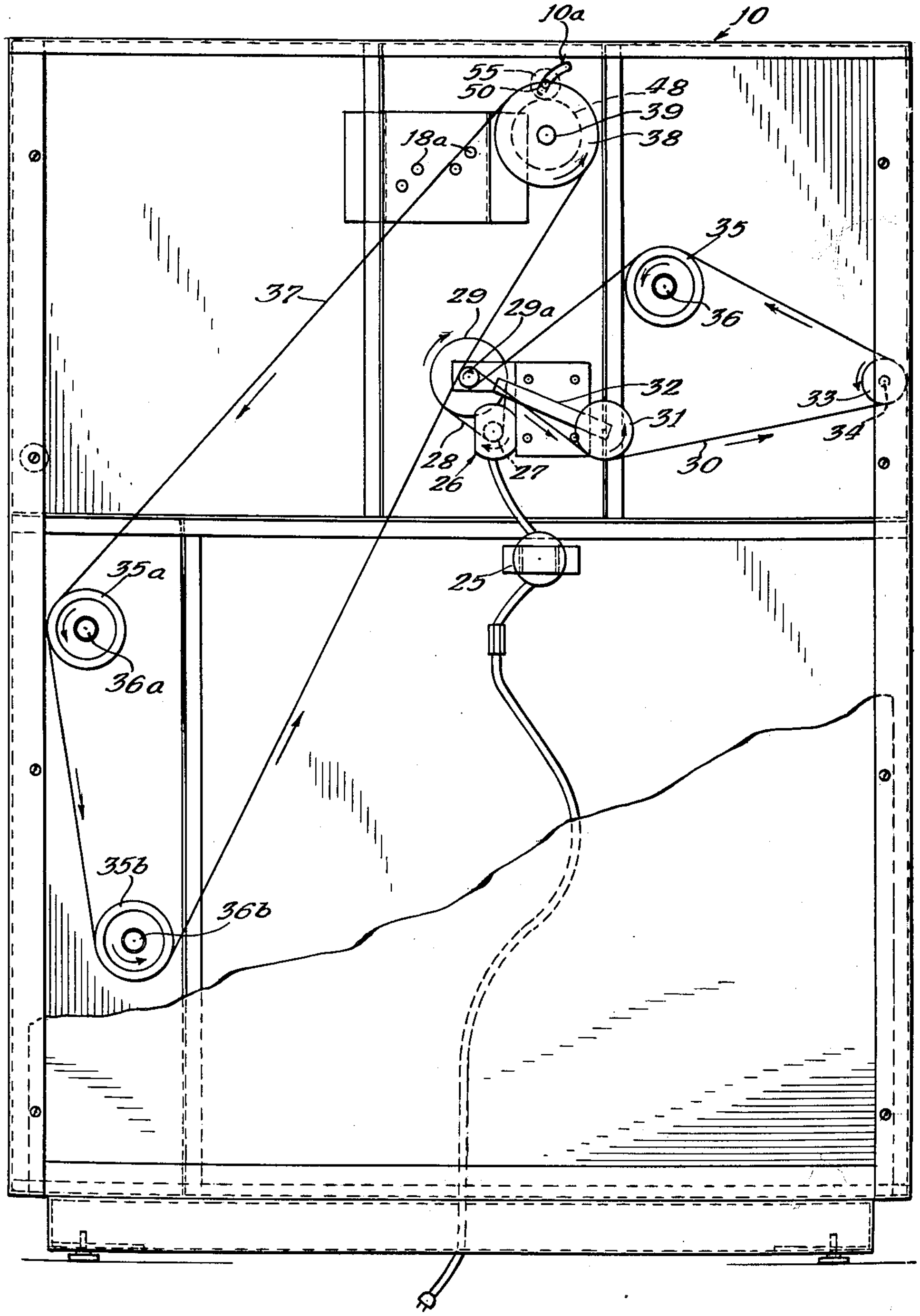
FIGURE 3 is a rear elevation view in partial vertical section taken along the line 3—3 of FIGURE 2.

Referring now to FIGURE 3, the rear portion of the mechanism 10 includes a control box 25 and an electrically connected motor assembly 26. Attached to motor 26 is a motor pulley 27 which cooperates with V-belt 28 to drive pulley 29. Pulley 29 cooperates with two systems of belts to drive all the components of the deleaver mechanism. In the first of these systems belt 30 passes over idler wheel 31, rotatably mounted on arm 32, supplemental drive roller pulley 33 on shaft 34, carbon rewind pulley 35 on shaft 36, and belt pulley **29*a*. In the second of these systems V-belt 37 passes over feed roller pulley 38 on feed roller shaft 39, carbon rewind pulley 35*a* on shaft 36*a*, carbon rewind pulley 36*b* on shaft 35*b*, and then belt pulley 29**, thus driving both systems.

The operation of the deleaver mechanism with particular reference to FIGURES 1 and 4 is as follows. A manifold stack of continuous form stationery 72 is shown resting on slidable supply tray 17 which has been pulled out of its storage space in receiving shelf **11*a*. Weighted roller 22, vertically slidably mounted in the deleaver is positioned on the top of the supply stack 72 near an end portion 72*a*. This positioning of roller 22 will prevent any one ply of the stationery from being pulled out of the stack faster than any other. Only when the driving unit 20 supplies equal tension to all plies of the stationery can the weight of roller 22** be overcome. Thus, this roller cooperates with the driving means to maintain the alignment of the stationery.

Since the device is designed to deleave 4 ply or less stationery the bottom ply or plies of record sheets and bottom carbon sheets designated as 73 in FIGURE 4 are passed over supplemental driving roller 21, and the carbon sheet **73*b* between the third and fourth ply is wound on carbon rewind unit 18. The bottom record sheet or sheets 73*a* pass over the fold plate 16 and comes to rest on receiving shelf 11*a* in a pile on top of triangular pile level paper 15. The plate 15 operates so as to provide a rather level stack of deleaved record sheets by overcoming the tendencies of the deleaved plies to arch when coming to rest. This triangular plate 15*a* arches the center of the stack and this factor in combination with the tendency of the deleaved record sheets to go in an opposite direction produces a generally even pile after a plurality of record sheets have been disposed on the shelf such as 11*a***.

The remaining plies **73*c* of the stationery 73 are passed over drag roller 23 and through drive roller unit 20. The drag roller 23 is preferably made removable to facilitate loading of the bottom or extra plies over the roller 21. The drag roller 23 puts an adjustable amount of drag on the bottom ply passing over the roller. The adjustment knob or friction adjusting wheel 59** can be turned to vary the necessary amount of drag. This drag roller will cooperate with the driving mechanism to maintain alignment of the plies of the stationery.

Referring to the drive roller unit 20 and FIGURE 7 as well as FIGURES 1 and 4, the remaining plies **73*c* are passed between feed roller 48 and pressure roller 55. The relation of the gears 49 and 47 is such that the peripheral speed of feed roller 48 and pressure roller 55 is the same. Thus the bottom and top ply of the stationery are propelled at essentially the same speed and the coefficient of friction between the intermediate plies and the bottom and top plies causes them to be propelled at essentially the same speed. The flat portion 55*a* of the pressure roller 55 allows misaligned portions of the stationery to become realigned. Misaligned stationery tends to form an irregular surface or "bubbles." By providing a relief on roller 55 for every revolution, a substantial portion of the misaligned stationery can pass between rollers 55 and 48** and misalignment is kept at a minimum.

After leaving the drive unit 20, the remaining record sheets and carbon leaves pass to the receiving shelves and carbon spindles in substantially the same manner as the bottom ply as illustrated in FIGURE 4 by record sheet **73*f* and carbon leaf 73*e*, with the carbon leaves passing over removable carbon support rods 18*a*** in their path of travel.

In the preferred embodiment of our invention the deleaver is provided with four receiving shelves and thus is adapted to process two to four ply sets of continuous form stationery. Sets of more than four ply can also be processed by making subsequent passes through the deleaver. If stationery containing more than four plies is to be processed the number of plies greater than four along with the fourth ply would be directed to the shelf **11*a*** and taken from there and reprocessed again.

Because the stationery is driven through the mechanism by means of the feed roller, and a pressure roller the carbon spindles are used only to rewind the carbon leaves offered, this mechanism can be used to separate forms which do not possess interleaved carbon sheets.

Having thus described our invention as related to the embodiment shown in the accompanying drawings, it is our intention that the invention be not limited by any of the detailed description unless otherwise specified, but rather be construed broadly within a spirit and scope as set out in the accompanying claims.

We claim:

1. A mechanism for deleaving continuous form stationery, said stationery being normally disposed in a stacked condition, comprising: means for propelling said stationery through the deleaving mechanism; drag means in said deleaving mechanism, said drag means being located in the path of travel of the stationery through the deleaving mechanism in a position whereby it cooperates with said propelling means to maintain alignment of the stationery.

2. A mechanism for deleaving continuous form stationery, said stationery being normally disposed in a stacked condition, comprising: means for propelling said stationery through the deleaver mechanism, tensioning means adapted to apply force to a supply stack of said stationery positioned in said deleaver mechanism, said means cooperating with said propelling means to maintain the stationery in alignment, said tensioning means being automatically adjustable with regard to the variable thickness of the supply stack, whereby said force remains relatively constant.

3. A mechanism for deleaving continuous form stationery, said stationery being normally disposed in a stacked condition, comprising: means for propelling said stationery between the deleaver mechanism; drag means in said deleaving mechanism, said drag means being located in the path of travel of the stationery through the deleaving mechanism in a position whereby it cooperates with said propelling means to maintain alignment of the stationery; and tensioning means adapted to apply force to a supply stack of said stationery positioned in said deleaver mechanism, said tensioning means cooperating with said propelling means to maintain the stationery in alignment, said tensioning means being automatically adjustable with regard to the variable thickness of the supply stack whereby said force remains relatively constant.

4. A mechanism for deleaving continuous form stationery, said stationery being normally disposed in a stacked condition, comprising: propelling means for driving means for driving said stationery through the deleaver mechanism including a pair of driving rollers driven at a substantially constant peripheral speed, said driving rollers in surface contact with the upper and lower plies of said stationery whereby said stationery is propelled at a substantially uniform speed through the deleaver mechanism; and an adjustable drag roller in said deleaver mechanism, said drag roller being located in the path of travel of the stationery through the deleaver mechanism in a position whereby it cooperates with said driving means to maintain alignment of the stationery.

5. A mechanism for deleaving continuous form stationery, said stationery being normally disposed in a stacked condition, comprising: propelling means for driving said stationery through the deleaver mechanism including a pair of driving rollers driven at a substantially constant peripheral speed, said driving rollers in surface contact with the upper and lower plies of said stationery whereby said stationery is propelled at a substantially uniform speed through the deleaver mechanism, and a weighted roller adapted to apply force to a supply stack of stationery positioned in said deleaver mechanism, said weighted roller cooperating with said driving means to maintain the stationery in alignment said weighted roller being automatically adjustable with regard to the variable thickness of the supply stack whereby said force remains relatively constant.

6. A mechanism for deleaving continuous form stationery, said stationery being normally disposed in a stacked condition, comprising: propelling means for driving said stationery through the deleaver mechanism including a pair of driving rollers driven at a substantially constant peripheral speed, said driving rollers in surface contact with the upper and lower plies of said stationery whereby said stationery is propelled at a uniform speed through the deleaver mechanism; an adjustable drag roller in said deleaver mechanism, said drag roller being located in the path of travel of the stationery through the deleaver mechanism in a position whereby it cooperates with said driving means to maintain alignment of the stationery; and a weighted roller adapted to apply force to a supply stack of said stationery positioned in said deleaver mechanism, said weighted roller cooperating with said driving means to maintain the stationery in alignment, said weighted roller being automatically adjustable with regard to the variable thickness of the supply stack whereby said force remains relatively constant.

7. A mechanism for deleaving continuous form stationery, said stationery being normally disposed in a stacked condition, comprising: driving means for driving said stationery through the deleaver mechanism including a pair of aligned driving rollers driven at a substantially constant peripheral speed, said driving rollers in surface contact with the upper and lower plies of said stationery and journaled transversely to the path of travel of said stationery, one of said driving rollers being mounted on a slidable shaft normal to the path of travel of said stationery to provide for movement of the driving roller corresponding to the surface of the stationery being driven by said driving roller; a drag roller in said deleaver mechanism, said drag roller being provided with an adjustable friction washer to vary the drag applied to the roller, said drag roller being located in the path of travel of the stationery through the deleaver mechanism in advance of the driving means whereby it cooperates with said driving means to maintain alignment of the stationery; a stacking shelf for receiving a stack of said stationery for feeding into the deleaver mechanism and a plurality of receiving shelves for receiving deleaved record sheets of said stationery, said receiving shelves including carbon spindles for receiving deleaved carbon sheets from said stationery.

8. A mechanism for deleaving continuous form stationery, said stationery being normally disposed in a stacked condition, comprising: driving means for driving said stationery through the deleaver mechanism including a pair of aligned driving rollers driven at a substantially constant peripheral speed, said driving rollers in surface contact with the upper and lower plies of said stationery and journaled transverse to the path of travel of said stationery, one of said driving rollers being mounted on a slidable shaft normal to the path of travel of said stationery to provide for movement of the driving roller corresponding to the surface of the stationery being driven by said driving roller; a weighted roller to apply weight to a supply stack of said stationery positioned in said deleaver mechanism, said weighted roller cooperating with said driving means to maintain the stationery in alignment, said weighted roller being slidably mounted in vertical slots so as to be automatically adjustable with regard to the variable thickness of the supply stack whereby said weight remains relatively constant, said weighted roller being positioned in the path of travel of said stationery in advance of said driving means; a stacking shelf for receiving a stack of said stationery for feeding into the deleaver mechanism and a plurality of receiving shelves for receiving deleaved record sheets of said stationery, said receiving shelves including carbon spindles for receiving deleaved carbon sheets from said stationery.

9. A mechanism for deleaving continuous form stationery, said stationery being normally disposed in a stacked condition, comprising: driving means for driving said stationery through the deleaver mechanism including a pair of aligned driving rollers driven at a constant peripheral speed, said driving rollers in surface contact with the upper and lower plies of said stationery and journaled transverse to the path of travel of said stationery, one of said driving rollers being mounted on a slidable shaft normal to the path of travel of said stationery to provide for movement of the driving roller corresponding to the surface of the stationery being driven by said driving roller; a drag roller in said deleaver mechanism, said drag roller being provided with an adjustable friction washer to vary the drag applied to the roller, said drag roller being located in the path of travel of the stationery through the deleaver mechanism in advance of the driving means whereby it cooperates with said driving means to maintain alignment of the stationery; a weighted roller to apply weight to a supply stack of said stationery positioned in said deleaver mechanism, said weighted roller cooperating with said driving means to maintain the stationery in alignment, said weighted roller being slidably mounted in vertical slots at both ends so as to be automatically adjustable with regard to the variable thickness of the supply stack whereby said weight remains relatively constant, said weighted roller also being positioned in the path of travel of said stationery in advance of said driving means; a stacking shelf for receiving a stack of said stationery for feeding into the deleaver mechanism; a plurality of receiving shelves for receiving deleaved record sheets of said stationery, a said receiving shelf including spindles for receiving deleaved carbon sheets from said stationery; and means for driving said carbon spindles.

10. The mechanism in claim 9 wherein said driving roller mounted on said movable shaft is provided with a flat surface on a portion of its periphery.

11. The mechanism claimed in claim 9 wherein said receiving shelves include triangular pile level plates mounted on said receiving shelves and extending triangularly normal to said receiving shelves.

References Cited in the file of this patent

UNITED STATES PATENTS

| | | |
|---|---|---|
| 2,265,466 | Winter | Dec. 9, 1941 |
| 2,805,855 | Sornberger | Sept. 10, 1957 |